United States Patent
Ando

(10) Patent No.: US 10,382,650 B2
(45) Date of Patent: Aug. 13, 2019

(54) INFORMATION PROCESSING SYSTEM, APPARATUS, INFORMATION PROCESSING APPARATUS, INFORMATION PROCESSING METHOD, AND PROGRAM FOR IMPROVING EFFICIENCY IN PROGRAM DEVELOPMENT ACROSS MULTIPLE EXTERNAL SERVICES

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/830,354

(22) Filed: Dec. 4, 2017

(65) Prior Publication Data
US 2018/0176417 A1     Jun. 21, 2018

(30) Foreign Application Priority Data

Dec. 16, 2016  (JP) ................. 2016-244290

(51) Int. Cl.
| | |
|---|---|
| *H04N 1/44* | (2006.01) |
| *H04N 1/00* | (2006.01) |
| *G06F 21/31* | (2013.01) |
| *G06F 21/62* | (2013.01) |

(52) U.S. Cl.
CPC ......... *H04N 1/4413* (2013.01); *G06F 21/31* (2013.01); *G06F 21/629* (2013.01); *H04N 1/00344* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,554,685 B2 | 6/2009 | Akiyoshi et al. |
| 7,636,172 B2 | 12/2009 | Akiyoshi et al. |
| 7,812,978 B2 | 10/2010 | Ando et al. |
| 8,305,591 B2 | 11/2012 | Akiyoshi et al. |
| 8,522,229 B2 | 8/2013 | Ando et al. |
| 8,605,298 B2 | 12/2013 | Ando et al. |
| 8,752,041 B2 | 6/2014 | Akiyoshi et al. |
| 8,819,665 B2 | 8/2014 | Ando et al. |
| 8,988,693 B2 | 3/2015 | Ando |

(Continued)

FOREIGN PATENT DOCUMENTS

| | | |
|---|---|---|
| JP | 2014-032659 | 2/2014 |
| JP | 2017-073682 | 4/2017 |

*Primary Examiner* — Thomas D Lee
(74) *Attorney, Agent, or Firm* — IPUSA, PLLC

(57) ABSTRACT

An information processing system includes an information processing apparatus coupled to multiple external apparatuses respectively receiving a request through mutually different interfaces, wherein the apparatus includes a first transmission unit sending a first request to the information processing apparatus upon receipt of the first request through a unified interface unified relative to interfaces of the multiple external apparatuses from a first program included in the apparatus, and the information processing apparatus includes a second transmission unit sending a second request corresponding to the first request to the external apparatus through an interface of the external apparatus designated in the first request from among the multiple external apparatuses upon receipt of the first request.

14 Claims, 14 Drawing Sheets

(56) References Cited

U.S. PATENT DOCUMENTS

| | | |
|---|---|---|
| 9,003,394 B2 | 4/2015 | Ando |
| 9,019,516 B2 | 4/2015 | Akiyoshi et al. |
| 9,124,733 B2 | 9/2015 | Ando |
| 9,135,468 B2 | 9/2015 | Ando |
| 9,141,374 B2 | 9/2015 | Ando |
| 9,164,865 B2 | 10/2015 | Ando et al. |
| 9,167,113 B2 | 10/2015 | Akiyoshi et al. |
| 9,235,453 B2 | 1/2016 | Ando |
| 9,258,357 B2 * | 2/2016 | Huang .................... H04W 4/60 |
| 9,374,490 B2 | 6/2016 | Ando |
| 9,544,473 B2 | 1/2017 | Namihira et al. |
| 9,756,202 B2 | 9/2017 | Ando |
| 2006/0206458 A1* | 9/2006 | Tyma ..................... G06F 9/445 |
| 2007/0061438 A1* | 3/2007 | Yuki ..................... H04L 67/025 |
| | | 709/223 |
| 2009/0180146 A1* | 7/2009 | Tomita .................. G06F 3/1203 |
| | | 358/1.16 |
| 2013/0191443 A1* | 7/2013 | Gan .................... H04L 67/1097 |
| | | 709/203 |
| 2013/0304756 A1* | 11/2013 | Conradi ................. G06Q 10/10 |
| | | 707/766 |
| 2015/0186188 A1 | 7/2015 | Ando |
| 2016/0342577 A1 | 11/2016 | Ando |
| 2017/0102865 A1 | 4/2017 | Ando |
| 2017/0195391 A1* | 7/2017 | Elad ...................... H04L 65/608 |
| 2017/0272601 A1 | 9/2017 | Ando |
| 2017/0339232 A1 | 11/2017 | Ando |

* cited by examiner

FIG.6

| DUID | DPWD | ... | ~131 |
|------|------|-----|------|
| duser1 | ... | ... | |
| duser2 | ... | ... | |
| : | : | : | |

| DUID | DPWD | TENANT ID | SUID | ATOKEN | EXPIRY DATA | PER-MISSION LIST | REFUSAL LIST |
|------|------|-----------|------|--------|-------------|------------------|--------------|
| duser1 | ... | 0001 | suser1 | atoken1 | 2016/12/01 | app1 | app3 |
| | | | | | | app2 | app4 |
| | | 0002 | suser1a | atoken2 | 2016/12/03 | app5 | app1 |
| | | | | | | app6 | app2 |
| duser2 | ... | 0001 | suser2 | atoken3 | 2016/12/03 | | app1 |
| | | | | | | | app2 |
| | | | | | | | app3 |
| | | | | | | | app4 |
| : | : | : | : | : | : | : | : |

| TENANT ID | |
| USER ID | |
| PASSWORD | |

RETURN    SIGN-IN

! THIS ACCOUNT IS INITIALLY USED FOR THIS APPLICATION. DO YOU PERMIT TO USE THIS ACCOUNT FOR THIS APPLICATION?

Service         SI
Account Name    suser1

521 NO        522 YES

530

! YOU DO NOT CURRENTLY PERMIT THIS ACCOUNT
TO BE USED FOR THIS APPLICATION.
DO YOU PERMIT TO USE THIS ACCOUNT?

Service        SI
Account Name   suser1

531 NO          532 YES

| CSID | ATOKEN | TARGET DATA INFORMATION | DELIVERY DESTINATION STORAGE | DELIVERY DESTINATION FOLDER |
|---|---|---|---|---|
| 500 | atoken1 | /hdd/scan.pdf | Offff | 600 |
| 501 | atoken2 | ScanJob(700) | GGGDrive | 601 |

| CSID | ATOKEN | DOWNLOAD SOURCE STORAGE | TARGET DATA INFORMATION | DOWNLOAD DESTINATION FOLDER |
|---|---|---|---|---|
| 502 | atoken3 | 0ffff | 602 | /hdd/folder1 |
| 503 | atoken2 | GGGDrive | 603 | /hdd/folder2 |

133

INFORMATION PROCESSING SYSTEM, APPARATUS, INFORMATION PROCESSING APPARATUS, INFORMATION PROCESSING METHOD, AND PROGRAM FOR IMPROVING EFFICIENCY IN PROGRAM DEVELOPMENT ACROSS MULTIPLE EXTERNAL SERVICES

CROSS-REFERENCE TO RELATED APPLICATIONS

The present application claims priority under 35 U.S.C. § 119 to Japanese Patent Application No. 2016-244290, filed Dec. 16, 2016. The contents of which are incorporated herein by reference in their entirety.

BACKGROUND OF THE INVENTION

Field of the Invention

The present invention relates to an information processing system, an apparatus, an information processing apparatus, an information processing method, and a program.

Description of the Related Art

Among various apparatuses including an image forming apparatus, there is an apparatus which includes an application platform and is configured to install an application program (hereinafter, referred to as an "app"), which is developed on the application platform, at any time.

Among apps installed into the apparatus, there is an app which can serve a new additional value by collaborating with an external service (for example, a cloud service), which is provided through a network such as the Internet. An example of this app is an app installed into the image forming apparatus, by which image data are obtained by scanning an original, and uploading the obtained image file into the cloud server.

An interface (an Application Program Interface (API)) of a service (hereinafter, referred to as an "external service") provided through the network is highly frequently changed relative to the interface of the application platform of the apparatus. Further, there is a case where compatibility of the interface is not ensured. Therefore, an app using the external service has a higher frequency of requiring an alternation in comparison with an app without using the external service, and has a higher probability of increasing burden of a developer.

In case of an app using multiple external services (for example, an app using multiple cloud services), interfaces respectively differ for the external services. Therefore, it is necessary to differently call the interfaces of different services. Here, when the number of external services to be used increases, the frequency of altering the app increases.

SUMMARY OF THE INVENTION

An information processing system including an information processing apparatus and an apparatus, the information processing apparatus being coupled to multiple external apparatuses, which respectively receive a request through mutually different interfaces, wherein the apparatus includes a first transmission unit configured to send a first request to the information processing apparatus upon receipt of the first request through a unified interface, which is unified relative to interfaces of the multiple external apparatuses, from a first program included in the apparatus, and wherein the information processing apparatus includes a second transmission unit configured to send a second request corresponding to the first request to the external apparatus through an interface of the external apparatus designated in the first request from among the multiple external apparatuses upon receipt of the first request.

BRIEF DESCRIPTION OF THE DRAWINGS

FIG. 6 illustrates an example of a structure of an authentication information memory unit 131.

FIG. 7 illustrates an example of a structure of an access information memory unit.

FIG. 8 is an exemplary display of an authentication necessity setup screen;

FIG. 9 illustrates an example of a display of a permission screen.

FIG. 15 illustrates an example of a structure of a document information memory unit 133.

DESCRIPTION OF THE EMBODIMENTS

Embodiments of the present invention are provided in consideration of the background art. One object of the embodiments is to improve development efficiency of a program using an external service provided outside an apparatus.

Figure 1:
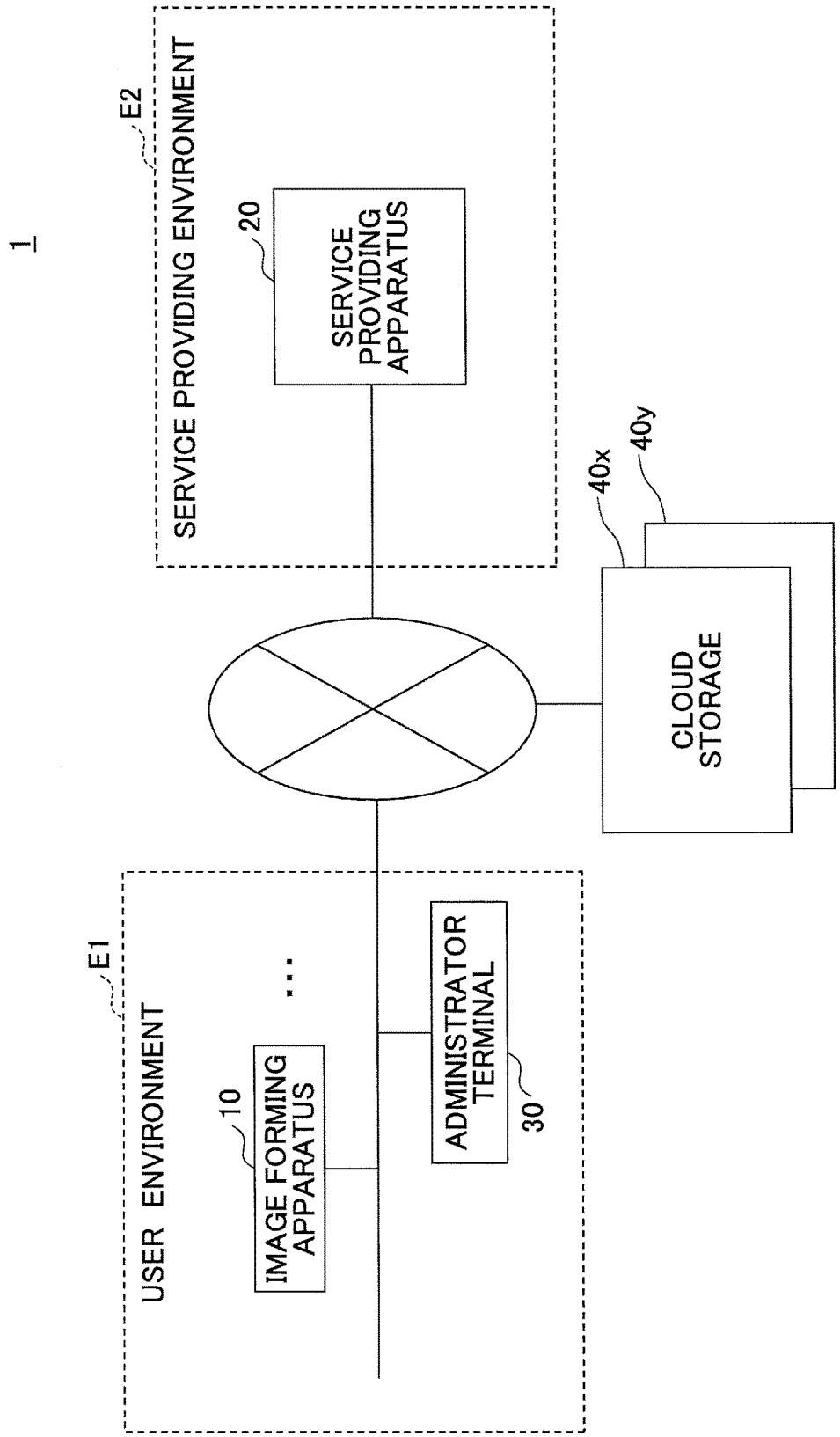
FIG. 1 illustrates an example of a structure of an information processing system of an embodiment of the present invention.

Hereinafter, an embodiment of the present invention is described based on figures. FIG. 1 illustrates an example of a structure of an information processing system of an embodiment of the present invention. In the information processing system 1 illustrated in FIG. 1, a service providing environment E2, a user environment E1, a cloud storage 40x, a cloud storage 40y, and so on are connected through a wide area network such as the Internet.

The service providing environment E2 is a system environment in an organization which provides a cloud service through a network. This service may be provided in a mode of a cloud service or in another mode such as a service provided by an Application Service Provider (API) and a Web service. The name of the service does not limit the service as long as the mode of providing the service is through the network. Within the embodiment, the service providing environment E2 provides a service facilitating usage of the cloud storages 40x and 40y by the image forming apparatus 10 in the user environment E1.

The service providing environment E2 includes a service providing apparatus 20. The service providing apparatus 20 provides the above service through the network. For example, the service providing apparatus 20 provides a service of delivering image data scanned by the image forming apparatus 10 to any one of the cloud storages 40. Said differently, the service providing apparatus 20 may be installed in the user environment E1. Said differently, the service providing environment E2 may be included in the user environment E1.

The user environment E1 is a system environment in a user enterprise or the like of the image forming apparatus 10. In the user environment E1, one or more image forming apparatuses 10 is connected to an administrator terminal 30 via a network such as a Local Area Network (LAN) or the like.

The image forming apparatus 10 of the embodiment is an image forming apparatus having a scan function. The image forming apparatus 10 may be a multifunction peripheral having print, copy, or facsimile (FAX) communication functions in addition to the scan function.

The administrator terminal 30 is used by an administrator of the image forming apparatus 10 in the user environment E1. An example of the administrator terminal 30 is a personal computer (PC), a personal digital assistance (PDA), a tablet-type terminal, a smart phone, a mobile phone, or the like. The smartphone is typically a terminal having various functions such as a communication function as a portable phone, an image capturing function like a camera, and a Web information displaying function like a personal computer (PC). Further, a tablet terminal is typically a terminal in a tablet type functioning as a multifunctional terminal like a smartphone.

The cloud storage 40x and the cloud storage 40y (hereinafter, the cloud storages 40x and 40y are commonly referred to as a "cloud storage 40") are a computer system providing a service of lending a storage (a memory area) through a network.

Figure 2:
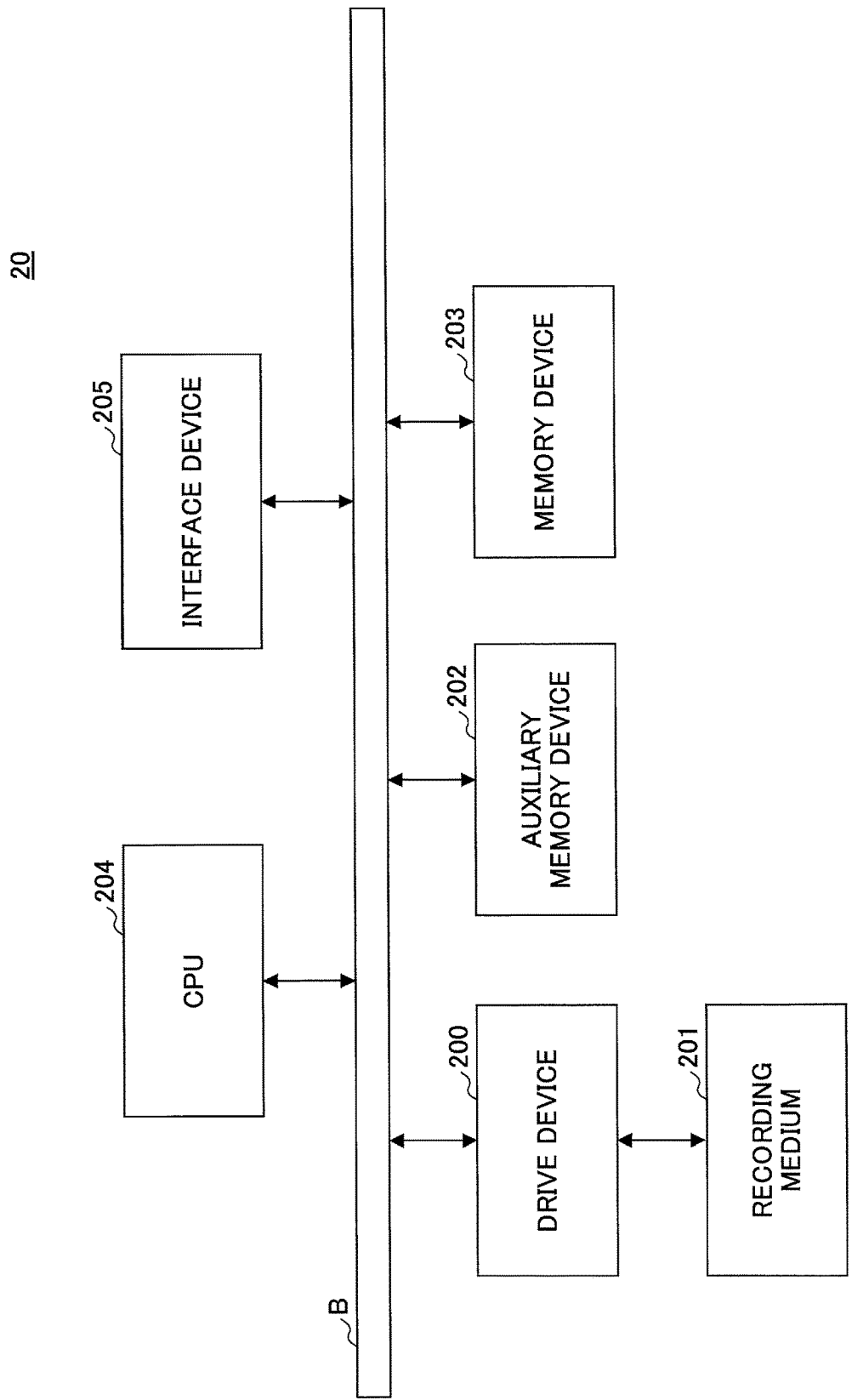
FIG. 2 illustrates an example of a hardware structure of a service providing apparatus 20 of the embodiment.

FIG. 2 illustrates an example of a hardware structure of the service providing apparatus of the embodiment. As illustrated in FIG. 2, the service providing apparatus 20 includes a drive device 200, an auxiliary memory device 202, a memory device 203, a CPU 204, and an interface device 205, which are mutually connected through a bus B.

A program substantializing processes in the service providing apparatus 20 is supplied by a recording medium 201 such as a CD-ROM. When the recording medium 201, in which the program is recorded, is set into the drive device 200, the program is installed on the auxiliary memory device 202 through the drive device 200 from the recording medium 201. However, the program needs not to be always installed from the recording medium 201 and may be downloaded from another computer via the network. The auxiliary memory device 202 stores necessary files, data, and so on in addition to the installed program.

The memory device 203 reads out the program from the auxiliary memory device 202 when the program is instructed to be invoked and stores the read program into the memory device 203. The CPU 204 performs a function related to the service providing apparatus 20 in conformity with the program stored in the memory device 203. The interface device 205 is used as an interface for connecting to the network.

The service providing apparatus 20 may be formed by multiple computers including hardware illustrated in FIG. 2. Said differently, processes performed by the service providing apparatus 20 described below may be distributed and executed by multiple computers.

Figure 3:
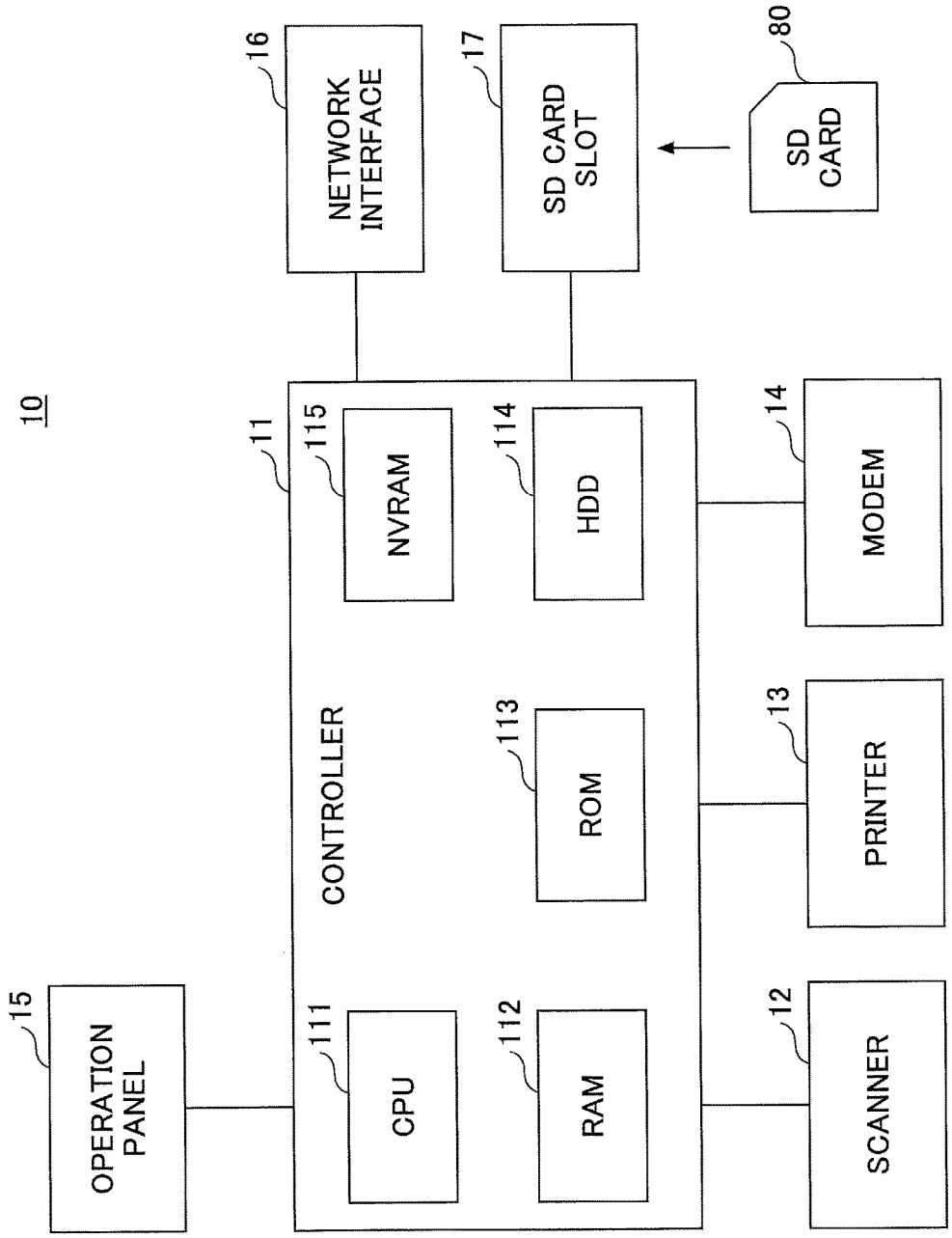
FIG. 3 illustrates an example of a hardware structure of an image forming apparatus of the embodiment.

FIG. 3 illustrates an example of a hardware configuration of the image forming apparatus 10 of the embodiment of the present invention. Referring to FIG. 3, the image forming apparatus 10 includes hardware such as a controller 11, a scanner 12, a printer 13, a modem 14, an operation panel 15, a network interface 16, and an SD card slot 17.

The controller 11 includes a central processing unit (CPU) 111, a random access memory (RAM) 112, a read-only memory (ROM) 113, a hard disk drive (HDD) 114, a non-volatile random access memory (NVRAM) 115, and so on. Various programs and data used by the programs are stored in the ROM 113. The RAM 112 is used as a memory area for loading the programs, a work area for the loaded programs, or the like. The CPU 111 implements various functions by processing the program loaded into the RAM 112. The HDD 114 stores the programs, various data used by the programs, or the like. The NVRAM 115 stores various kinds of setup information or the like.

The scanner 12 is hardware (an image reading unit) for reading image data from an original (an original manuscript). The printer 13 is hardware (a printing unit) for printing print data on a print paper. The modem 14 is hardware for connecting the image forming apparatus 10 to a telecommunication line and is used for sending and receiving the image data with fax communications. The operation panel 15 is hardware provided with an input unit for receiving an input from the user such as a button, a display unit such as a liquid crystal panel, or the like. The network interface 16 is hardware for connecting the image forming apparatus 10 to a wired or wireless network such as LAN. The operation panel 15 may be formed by an information processing terminal including a CPU independent from the controller 11. The information processing terminal is such as a tablet terminal and a smartphone. In this case, a wired or wireless communication media may connect the operation panel 15 with the controller 11.

The SD card slot 17 is used to read a program stored in an SD card 80. Said differently, not only the program stored in the ROM 113 but also the program stored in the SD card 80 may be loaded into the RAM 112 and executed by the image forming apparatus 10. The SD card 80 may be replaced by another recording medium such as a CD-ROM and a universal serial bus (USB) memory. The type of the recording medium substituting for the SD card 80 is not specifically limited. In this case, the SD card slot 17 may be replaced by hardware depending on kinds of the recording medium.

Figure 4:
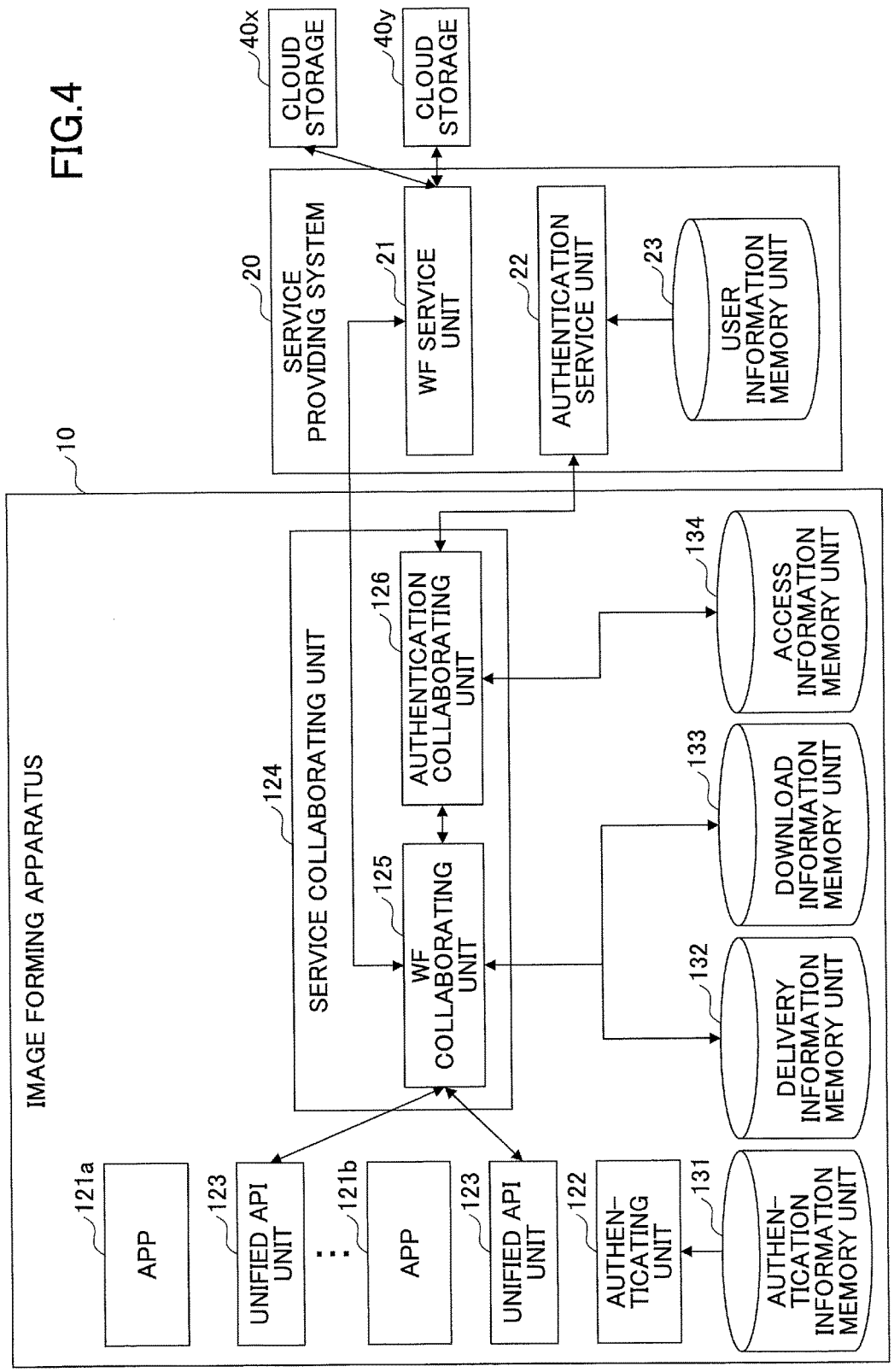
FIG. 4 illustrates an example of a functional structure of the information processing system of the embodiment.

FIG. 4 illustrates an example of a functional structure of the information processing system of this embodiment. Referring to FIG. 4, the service providing apparatus 20 includes a WF service unit 21 and an authentication service unit 22. The WF service unit 21 and the authentication service unit 22 are substantialized when at least one program installed in the service providing apparatus 20 is executed to perform a process. The service providing apparatus 20 uses a user information memory unit 23. The user information memory unit 23 can be substantialized by a memory device coupled to the service providing apparatus 20 through a network.

The WF service unit 21 executes a workflow for accessing the cloud storage 40. The workflow is previously defined. An example of the workflow is a workflow of delivering (uploading) data to the cloud storage 40, a workflow of uploading data generated by executing a series of processes such as OCR in the service providing apparatus 20, a workflow of downloading data stored in the cloud storage 40, and so on.

The authentication service unit 22 authenticates an access from the image forming apparatus 10 to the service providing apparatus 20, for example.

The user information memory unit 23 stores identification information of the users who are permitted to access the service providing apparatus 20 and so on.

The image forming apparatus 10 includes multiple application programs such as an app 121*a* and an app 121*b* (hereinafter, the apps 121*a* and 121*b* are commonly referred to as an "app 121"), an authenticating unit 122, a unified API unit 123, and a service collaborating unit 124. These units and so on are substantialized by a process of executing at least one program installed in the controller 11 or the operation panel 15 by the CPU 111 or a CPU of the operation panel 15. The image forming apparatus 10 uses an authentication information memory unit 131, a delivery information memory unit 132, a download information memory unit 133, an access information memory unit 134, and so on. These authentication information memory unit 131, delivery information memory unit 132, download information memory unit 133, and access information memory unit 134 may be substantialized by, for example, the HDD 114, a memory device of the operation panel 15, or a memory device which may be coupled to the image forming apparatus 10 through a network.

The app 121 is an example pf a program installed in the image forming apparatus 10. In the embodiment, the app 121 provides a function using the cloud storage 40. An example of a function using a cloud storage 40 is a function of delivering image data scanned by the image forming apparatus 10 to the cloud storage 40 and a function of causing data stored in the cloud storage 40 to be printed by the image forming apparatus 10.

The authenticating unit 122 conducts an authentication process for a user logging in the image forming apparatus 10. The authenticating unit 122 specifies a user operating the image forming apparatus 10.

The unified API unit 123 is a library providing a unified or common API (a function group or a method group) differing for each cloud storage 40 to the app 121 in response to identical requests or similar requests (requests of identical types). Hereinafter, an interface provided by the unified API unit 123 is referred to as a "unified API". Referring to FIG. 4, the unified API unit 123 is illustrated for each app 121. This means that the unified API unit 121 is linked to each app 121. However, it is not illustrated that the unified API units 123 respectively and differently exist for the apps 121.

The service collaborating unit 124 serves a service for facilitating usage of the cloud storage 40 collaborating with the service providing apparatus 20. Referring to FIG. 4, the service collaborating unit 124 includes a WF collaborating unit 125 and an authentication collaborating unit 126.

The WF collaborating unit 125 sends an execution require to execute the workflow corresponding to the unified API called from the app 121 to the WF service unit 21 of the service providing apparatus 20.

The authentication collaborating unit 126 controls an authentication process required to collaborate with the service providing apparatus 20.

The authentication information such as a user ID and a password, which are for logging in the image forming apparatus 10, is stored in the authentication information memory unit 131 for each user.

Information to access the service providing apparatus 20 for each user is stored in the access information memory unit 134 for each user 20.

When the WF collaborating unit 125 is requested to deliver data to the cloud storage 40 (a unified API corresponding to the delivery request to deliver the data is called), the delivery information memory unit 132 stores information related to the request.

When the WF collaborating unit 125 is requested to download data from the cloud storage 40 (a unified API corresponding to the download request to download the data is called), the download information memory unit 133 stores information related to the request.

The delivery information memory unit 132 and the download information memory unit 133 are used to conduct the process (delivery, download, and so on) in response to the request from the app 121 in synchronization with the request. Said differently, the delivery information memory unit 132 and the download information memory unit 133 accumulate (queue) the requests from the app and enable to execute the process in response to the requests at a timing convenient for the WF collaborating unit 125.

As described above, within the embodiment, the app 121 does not directly call the API of the cloud storage 40 but calls the unified API to access the cloud storage 40 through the service collaborating unit 124 and the service providing apparatus 20. Said differently, the unified API unit 123, the service collaborating unit 124, and the service providing apparatus 20 function as a platform for facilitating an access to the cloud storage 40.

Figure 5:
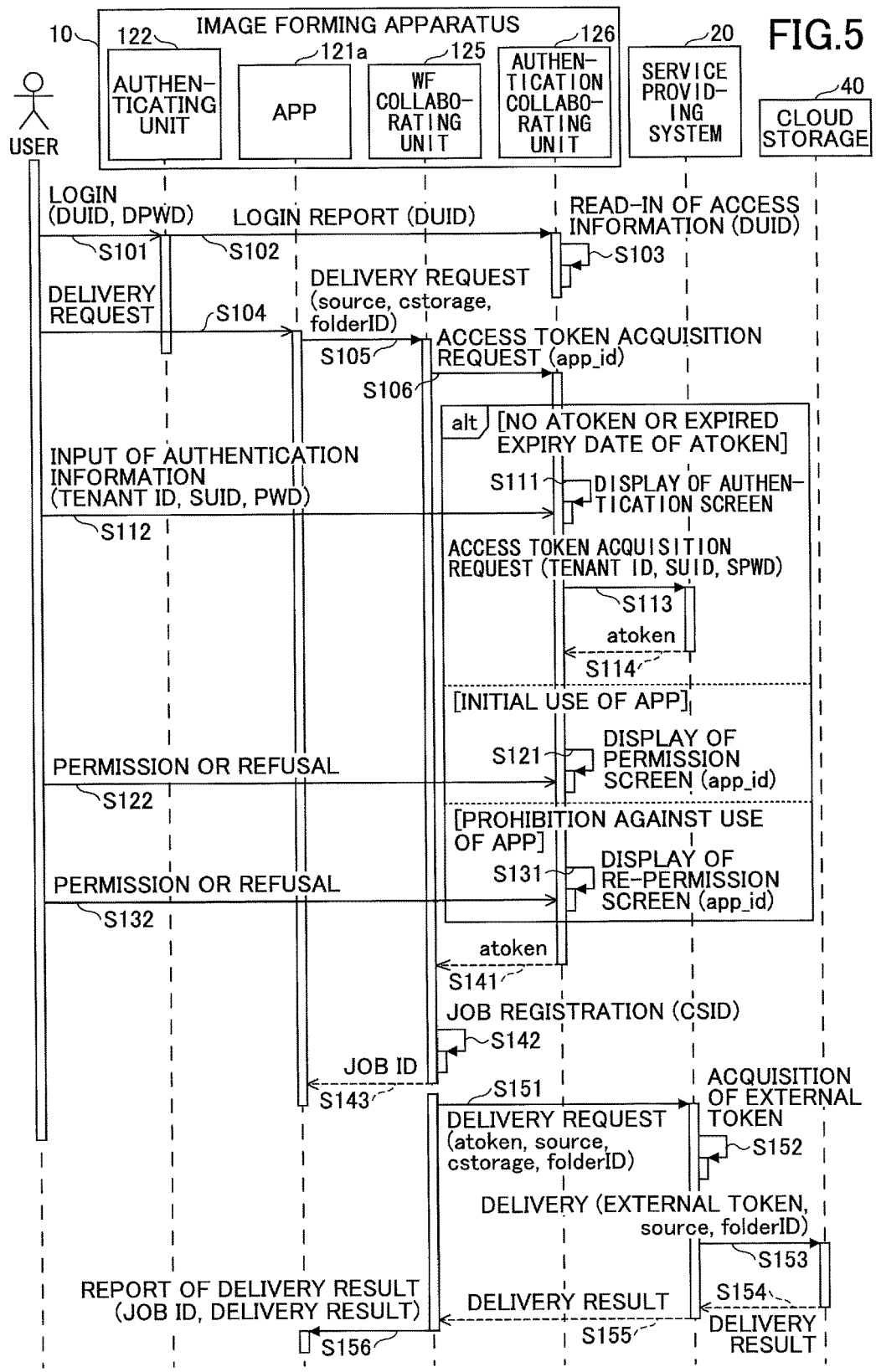
FIG. 5 is a sequence chart for explaining an example of a process performed in the information processing system.

Hereinafter, the procedure conducted by the information processing system 1 is described. FIG. 5 is a sequence chart for explaining an example of a process performed in the information processing system. In an initial state illustrated in FIG. 5, a login screen is displayed on the operation panel 15 of the image forming apparatus 10.

After the user inputs a user ID and a password through a login screen, the authenticating unit 122 collates the user ID and the password with information stored in the authentication information memory unit 131 to judge whether a login is permitted (step S101). Within the embodiment, described example is user authentication by inputting authentication information of the user through a login screen displayed on the operation panel 15. However, authentication using a card storing user information of an integrated circuit (IC) card may be conducted. Various information terminals such as a smartphone and a portable phone, which include a function used for the user authentication or into which the application is installed, may be implemented as an authentication device to perform the function similar to that in the case where the IC card is used. A recording medium, into which the user information may be stored, is usable in the embodiment in a manner similar thereto. Therefore, the memory medium usable for the user information may not be limited only to the IC card, an identity card/identification card (ID) card, and so on.

FIG. 6 illustrates an example of a structure of an authentication information memory unit 131. As illustrated in FIG. 6, DUID, DPWD, and so on are stored in the authentication information memory unit 131 for each user. DUID is a user ID (identification information of the user) allocated for each user in the image forming apparatus 10. DPWD is a password corresponding to DWUID. A set of DUID and DPWD of an identical user may differ for each image forming apparatus 10.

In step S101, if DUID and DPWD matching the input user ID and password are stored in the authentication information memory unit 131, the user is permitted to log in. If DUID and DPWD matching the input user ID and password are not stored in the authentication information memory unit 131, the user is refused to log in.

If the user (hereinafter, referred to as a login user) is permitted to log in, the authenticating unit 122 reports the login of the login user to the authentication collaborating unit 126 (step S102). The report to the authentication collaborating unit 126 includes DUID of the login user.

The authentication collaborating unit 126 reads access information including DUID from the access information memory unit 134 to the RAM 112 (S103).

FIG. 7 illustrates an example of a structure of the access information memory unit 134. As illustrated in FIG. 7, the access information memory unit 134 stores DUID, a tenant ID, SUID, ATOKEN, an expiry date, a permission list, a refusal list, and so on for the users who previously access the cloud storage 40.

The tenant ID is identification information allocated for each user environment, for example. SUID corresponds to DUID and is a user ID for the service providing apparatus 20. Multiple tenant IDs and SUIDs can be set to one user. Referring to FIG. 7, an example where two tenant IDs and two SUIDs are associated with duser1 is illustrated. However, the tenant ID may not be stored in the access information memory unit 134. Or, SUID may be ID for identifying the user including an object identified by the tenant ID. In this case, the tenant ID may not be used.

ATOKEN is an access token for accessing the service providing apparatus 20. The access token is an example of data indicating that the DUID is completely authenticated by the service providing apparatus 20. The expiry date is an expiry date of ATOKEN. The permission list is a view of identification information (hereinafter, referred to as "app ID") of an app 121, an access of which to the service providing apparatus 20 is permitted. The refusal list is a view of the app ID of the app 121, an access of which to the service providing apparatus 20 is prohibited.

In step S103, the authentication collaborating unit 126 reads the access information into the RAM 112 if the access information including the DUID of the user is stored in the access information memory unit 134. If the access information including the DUID is not stored in the access information memory unit 134, the access information including the DUID is generated by the access information memory unit 134, and the access information is read by the RAM 112. The generated access information may include only the DUID. Hereinafter, the read access information is referred to as a "target access information".

Thereafter, the user uses the app 121a to request a delivery of the identification information (source) of data of a delivery target, identification information (csource) of the cloud storage 40 at the delivery destination, and a folder ID (folderID) of the folder at the delivery destination, which are designated (S104). Then, the app 121a designates source, csource, and folderID, and inputs the delivery require into the WF collaborating unit 125 (S105). The delivery request is input through the unified API unit 123. Data of a delivery target may be image data obtained by scanning an original manuscript in the image forming apparatus 10 or data previously stored by the image forming apparatus 10. In a case where the image data obtained by scanning the original manuscript in the image forming apparatus 10, the app 121a causes the image forming apparatus 10 to scan the image data obtained from the original manuscript. Thereafter, the app 121a requests the WF collaborating unit 125 to deliver the image data.

The WF collaborating unit 125 requests the authentication collaborating unit 126 to send an access token (atoken) of the login user in response to the delivery request (S106). In the request, the app ID (app_id) of the app 121a at a delivery request source is designated.

The authentication collaborating unit 126 branches a process based on the target access information in response to the request for the access token. In a case where the app ID is included in the permission list in the target access information and the access token is not included in the target access information, or in a case where the access token is included in the target access information and the expiry date has been expired, the authentication collaborating unit 126 causes the authentication screen to be displayed on the operation panel 15 (S111).

FIG. 8 is an example of a display of an authentication screen. As illustrated in FIG. 8, the authentication screen 510 is a screen for receiving inputs of the tenant ID, the userID (SUID), and the password for logging in the service providing apparatus 20. A password for SUID is represented as "SPWD".

After the tenant ID, SUID, and SPWD are input through the authentication screen 510 (S112), the authentication collaborating unit 126 sends an acquisition request to acquire the access token to the authentication service unit 22 of the service providing apparatus 20 (S113). The acquisition request includes the tenant ID, SUID, and SPWD, each input through the authentication screen 510.

The authentication service unit 22 authenticates the tenant ID, SUID, and SPWD, each included in the acquisition request. Said differently, the authentication service unit 22 determines whether a group of the tenant ID, SUID, and SPWD is stored in the user information memory unit 23. In a case where this group is stored in the user information memory unit 23, the authentication is successful. Otherwise, the authentication is failed. In a case where the authentication is successful, the authentication service unit 22 generates the access token, and causes the access token and the expiry date of the access token to be stored in association with SUID into the user information memory unit 23, for example. The authentication service unit 22 returns the access token and the expiry date of the access token to the authentication collaborating unit 126 (S114). The authentication collaborating unit 126 adds the access token and the expiry date of the access token to the target access information. In a case where SUID is not included in the target access information, the authentication collaborating unit 126 adds this SUID to the target access information. The authentication collaborating unit 126 further adds the app ID of the app 121a to the permission list of the target access information. These renewals of the target access information are reflected on the access information memory unit 134. Meanwhile, in a case where the authentication is failed, the access token is not returned but information indicating the failed authentication is returned in step S114.

In a case where an effective access token is included in the target access information and the app 121a is firstly used (said differently, the app ID of the app 121a is not included in the permission list or the refusal list of the target access information), the authentication collaborating unit 126 displays the permission screen on the operation panel 15 (S121).

FIG. 9 illustrates an example of a display of the permission screen. As illustrated in FIG. 9, the permission screen 520 is a screen used to inquire for whether a user permits an access of a currently used app 121 (here, the app 121a) using SUID of a login user who is logging in.

The user pushes a button 521 when this access is refused and pushes a button 522 when this access is permitted (S122). The authentication collaborating unit 126 further adds the app ID of the app 121a to the permission list of the target access information when this access is permitted. The authentication collaborating unit 126 further adds the app ID of the app 121a to the refusal list of the target access information when this access is refused. These renewals of the target access information are reflected on the access information memory unit 134.

In a case where an effective access token is included in the target access information and an access of the app 121a to the service providing apparatus 20 is prohibited (said differently, the app ID of the app 121a is included in the refusal list of the target access information), the authentication collaborating unit 126 displays a re-permission screen on the operation panel 15 (S131).

Figures 10, 11:
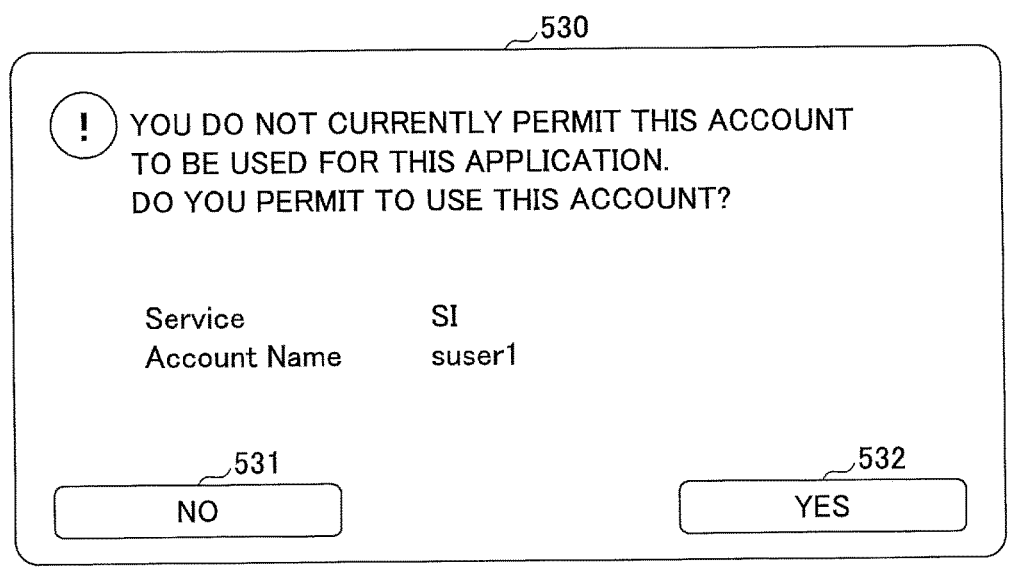
FIG. 10 illustrates an example of a display of a re-permission screen.
FIG. 11 illustrates an example of a structure of a delivery information memory unit 132.

FIG. 10 illustrates an example of a display of the re-permission screen. As illustrated in FIG. 10, the re-permission screen 530 is a screen used to inquire again for whether the user permits the access of the currently used app 121 (here, the app 121a) using SUID of the login user who is logging in.

The user pushes the button 531 when this access is refused and pushes the button 532 when this access is permitted (S132). The authentication collaborating unit 126 adds the app ID of the app 121a to the permission list of the target access information when this access is permitted. The authentication collaborating unit 126 adds the appID of the app 121a to the refusal list of the target access information when this access is refused. These renewals of the target access information are reflected on the access information memory unit 134.

Subsequent to step S114, S122, or S132, the authentication collaborating unit 126 returns the access token included in the target access information to the WF collaborating unit 125 (S141). In a case where the information indicating the failed authentication is returned in step S114 or in a case where the access is refused in step S122 or S132.

The WF collaborating unit 125 stores information related to the delivery request from the app 121a when the access token is returned (S142).

FIG. 11 illustrates an example of a structure of the delivery information memory unit 132. As illustrated in FIG. 11, the delivery information memory unit 132 stores CSID, ATOKEN, target data information, a delivery destination storage, a delivery destination folder, and so on.

CSID is a job ID allocated for each delivery request from the app 121. ATOKEN is an access token acquired in response to the delivery request. The target data information is identification information of the data being the delivery target. The delivery destination storage is identification information of the cloud storage c being the delivery destination. The delivery destination folder is identification information of the folder bound for the delivery destination. There is a case where an overlap of the same folder name unlike an ordinary file system. Therefore, the folder bound for the delivery destination has no folder name and can be designated by a folder ID being a unique ID number of the folder.

As illustrated in FIG. 11, the first record is a record in a case where data of a delivery target is selected from among data previously stored in the image forming apparatus 10. Therefore, the target data information of this record is a file path name of the selected data. Meanwhile, the second record is a record in a case where the scanned image data is selected as the delivery target. Therefore, the target data information of the record is "ScanJob(700)". Here, "700" designates an ID allocated to a scan job. Therefore, "Scan-Job(700)" designates the image data obtained in the scan job identified by 700. The image data may be comprised of a single page or multiple pages. In this case, the image data (file) may be generated for each page.

In step S142, a job ID generated for the delivery request of step S142, an access token returned in step S141, a job ID generated for the delivery request of step S105, the access token returned in step S141, and the record designated in the delivery request of step S105 and including source, cstorage, and folderID are added to the delivery information memory unit 132.

Subsequently, the WF collaborating unit 125 returns a response to the delivery request including a job ID (CSID) corresponding to the delivery request to the app 121a (S143). Said differently, a response is conducted before the delivery is executed. This is because the unified API is an asynchronous function.

Subsequently, the WF collaborating unit 125 sequentially executes a job corresponding to each record stored in the delivery information memory unit 132 at a predetermined timing. Specifically, the WF collaborating unit 125 sends a delivery request corresponding to each record to the WF service unit 21 of the service providing apparatus 20 (S151). The delivery request includes values of each item of the record to be processed.

The WF service unit 21 executes the process on and after step S152 if the access token included in the delivery request after receiving the delivery request. Said differently, if the access token included in the delivery request is stored in the user information memory unit 23 and the expiry date of the access token does not expires, the process on and after step S152 is executed.

In step S152, the WF service unit 21 acquires an access token (hereinafter, referred to as an "external token") for accessing the cloud storage 40 of the delivery destination from the user information memory unit 23 (S152). The user information memory unit 23 previously stores the external token for each cloud storage 40, to which the user can access. In step S152, the external token for the cloud storage 40 of the delivery destination is acquired. The external token is stored in the user information memory unit 23 in association with an access token included in the delivery request.

Subsequently, the WF service unit 21 delivers (uploads) the data being the delivery target of the cloud storage 40 to the folder in the delivery destination (steps S153 and S154). At this time, the external token is designated. The delivery is performed by calling the unique API unique to the cloud storage 40 at the delivery destination. Subsequently, the WF service unit 21 reports a delivery result (a success of failure of the delivery) to the app 121a of the delivery request source (S155). At this time, the job ID (CSID) for the delivery request corresponding to the delivery result is also reported to the app 121a. With this, the app 121a may determine which delivery request the delivery result corresponds to. The WF service unit 21 may remove the record corresponding to the job ID at this timing from the delivery information memory unit 132.

Figure 12:
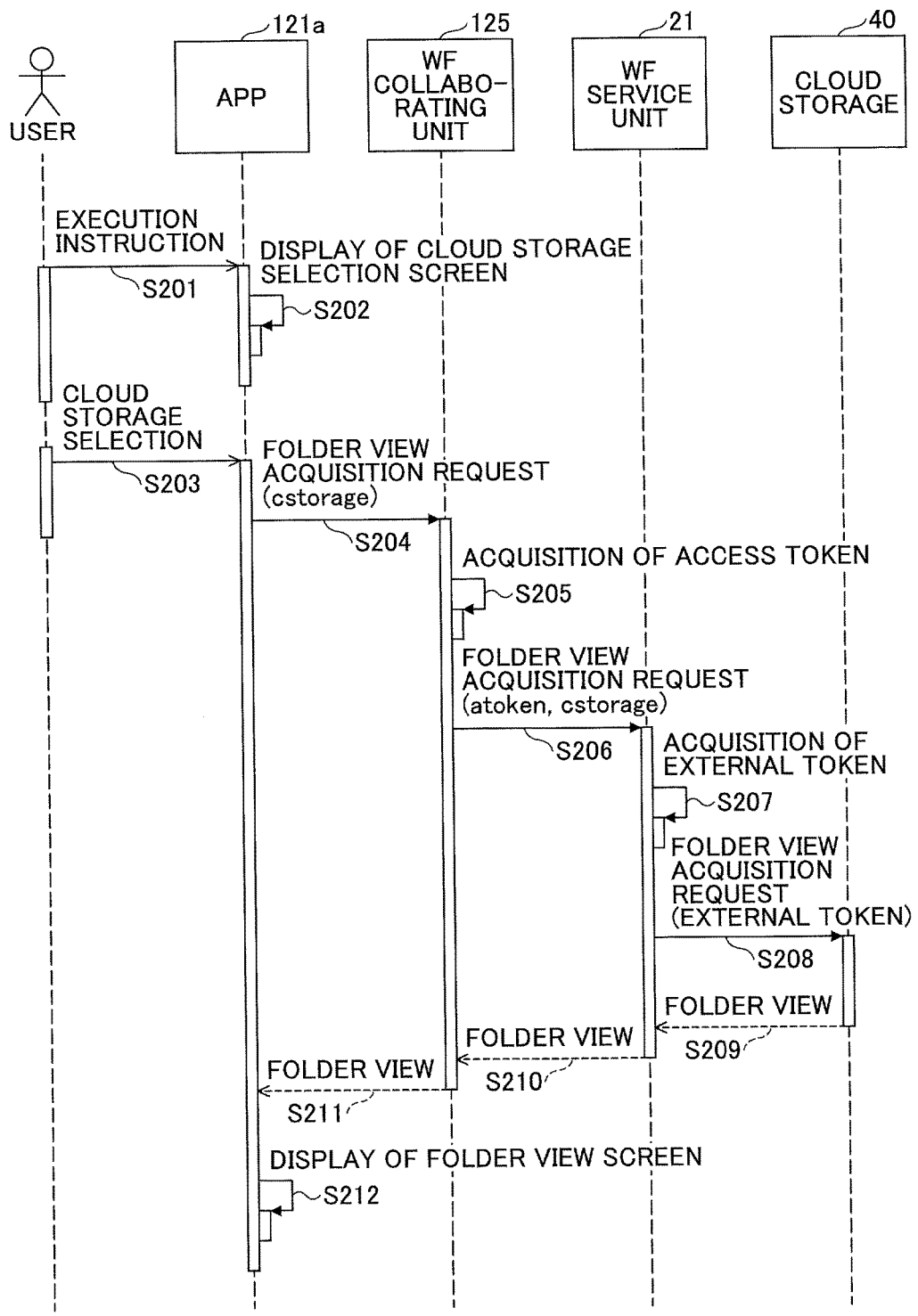
FIG. 12 is the sequence chart for explaining an example of a selection procedure of selecting a delivery destination.

Although a selection procedure of selecting the cloud storage 40 (cstorage) at the delivery destination and the folder ID (folderID) of the folder at the delivery destination is not described in detail above, cstorage and folderID may be selected by executing a procedure as illustrated in FIG. 12.

FIG. 12 is a sequence chart for explaining an example of a selection procedure of selecting a delivery destination. The procedure illustrated in FIG. 12 illustrates the content of step S104 illustrated in FIG. 5 in detail.

The user inputs an execution instruction to execute the app 121a through the operation panel (S201). The app 121a displays a cloud storage selection screen (S202).

Figure 13:
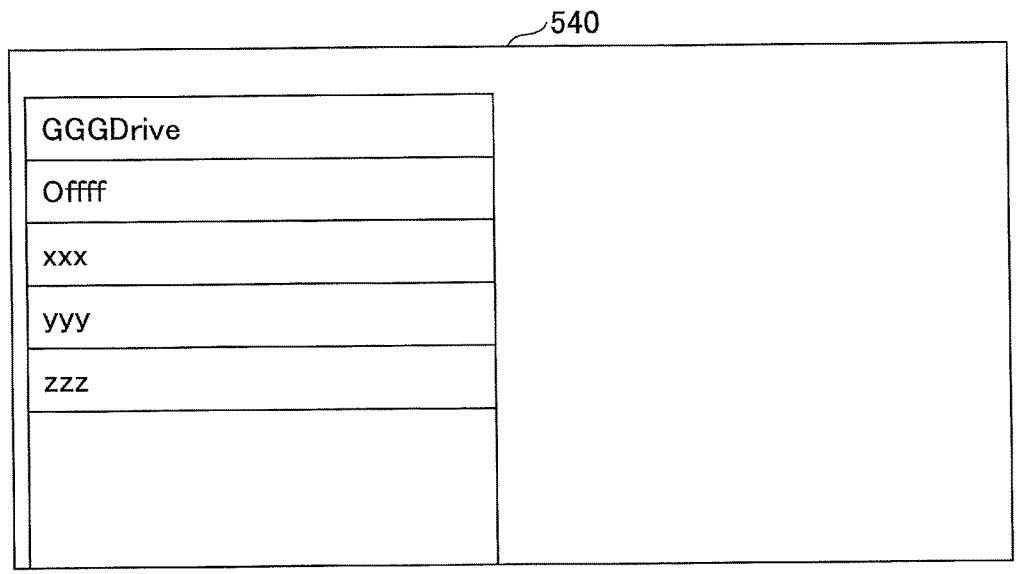
FIG. 13 is an example of displaying a cloud storage selection screen.

FIG. 13 is an example of a display of the cloud storage selection screen. As illustrated in FIG. 13, the cloud storage selection screen 540 includes a view of the cloud storage 40 which may be selected by a login user. The view of the cloud storage 40 which may be selected by a login user may be previously stored inside the image forming apparatus 10 or may be previously stored in the user information memory unit 23 of the service providing apparatus 20 or the like. In the latter case, the app 121a may download the view from the service providing apparatus 20.

The cloud storage 40 at the delivery destination is selected through the cloud storage selection screen 50 (S203). The app 121a designates identification information (cstorage) of the selected cloud storage 40 and inputs an acquisition request to acquire a folder view to the WF collaborating unit 125 (S204). The acquisition request is a part of the unified API.

The WF collaborating unit 125 requests the authentication collaborating unit 126 to send the access token of the login user in response to this acquisition request (S205). The app ID (app_id) of the app 121a is designated in this acquisition request. In response to this acquisition request, the process described in steps S111 to S131 illustrated in FIG. 5 is performed by the authentication collaborating unit 126.

After the access token is returned from the authentication collaborating unit 126, the WF collaborating unit 125 sends the acquisition request to acquire the folder view to the WF service unit 21 of the service providing apparatus 20 (S206). The access token and cstorage are designated in the acquisition request.

The WF service unit 21 acquires the external token, which is stored in user information memory unit 23 in association with the access token and corresponds to cstorage, in response to the acquisition request (S207). Subsequently, the WF service unit 21 designates the external token and sends the acquisition request to acquire the folder view to the cloud storage related to cstorage (S208). This acquisition request is sent by calling API unique to the cloud storage 40.

The folder view is returned from the cloud storage 40 (S209). The WF service unit 21 returns the folder view to the WF collaborating unit 125 (S210). The WF collaborating unit 125 returns the folder view to the app 121a as a response of the unified API to the app 121a (S211). Subsequently, the app 121a displays a folder view screen including the folder view on the operation panel 15 (S212).

Figure 14:
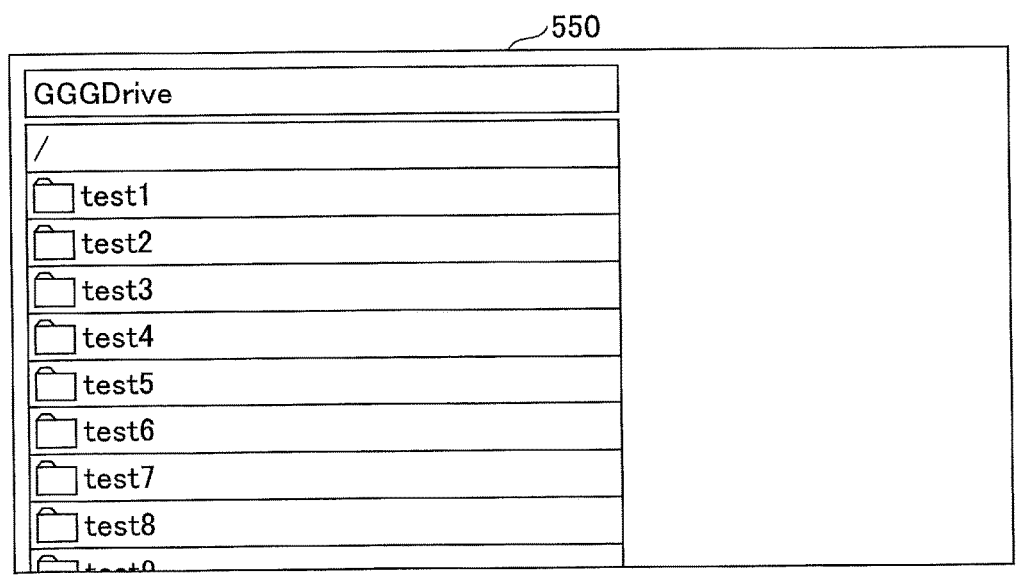
FIG. 14 is an example of displaying a folder view screen.

FIG. 14 is an example of a display of the folder view screen. As illustrated in FIG. 14, the folder view corresponding to the login user n the selected cloud storage 40 is included in the folder view screen 550.

After the folder of the delivery destination is selected by the user, the app 121a performs step S105 illustrated in FIG. 5.

In a case where the procedure illustrated in FIG. 12 is performed and the access token of the login user is acquired, the authentication collaborating unit 126 immediately returns this access token in response to the acquisition request to acquire the access token in step S106 illustrated in FIG. 5 (S141). Said differently, during the login (during the operation) of the login user, the same access token is used for the process corresponding to the unified API called by the app 121a. Further, even in a case where the login user uses another app 121 (for example, an app 121b) and the app 121b calls the unified API, the same access token as the access token used for the app 121a may be used. As a result, a single sign-on enabling the user to thoroughly use multiple apps 121 may be substantialized. Further, the access token is effective after the user logs out within a range of the expiry date. Said differently, within the expiry date of the access token when the login user logs in again, the user needs not to input SUID, SPWD, or the like.

In the above described example, there is the request for the delivery (the upload) from the app 121a to the WF collaborating unit 125. In a case where there is a request for a download from the app 121b to the WF collaborating unit 125, a procedure is basically similar to the procedure of the above described example. Specifically, a delivery request of step S105 may be replaced by a download request in step S105. Identification information of the cloud storage 40 at a download source, identification information of data to be downloaded, folder information at a download destination, and so on are designated in the download request. The download destination is a storage destination of storing the downloaded data.

In this case, a record is added to the download information memory unit 133 in step S142. FIG. 15 illustrates an example of a structure of the download information memory unit 133. As illustrated in FIG. 15, the download information memory unit 133 stores CSID, ATOKEN, a download source storage, target data information, a download destination folder, and so on are stored for each download request from the app 121. Referring to FIG. 15, IDs such as "602" and "603" are designated in the target data information. The cloud storage 40 may have a case where the same file names overlap. Therefore, data to be downloaded are designated using the unique ID number instead of using the file name.

Meanwhile, stress-free operability may be obtainable in operating the image forming apparatus 10 when the delivery information memory unit 132 and the download information memory unit 133 are used, and a process corresponding to the delivery request or the download request is asynchronously executed.

Said differently, the apparatus commonly owned by multiple users such as the image forming apparatus 10 is required to have stress-free operability for each user. The stress-free operability is realized if scanning and delivery are quickly completed with a simple operation even though instructions (for example, the scanned image data are delivered to the cloud storage 40) of the multiple users are interchanged. Within the embodiment, the request is accumulated in the delivery information memory unit 132 to substantialize the stress-free operability for the scanning and delivery.

Figure 16:
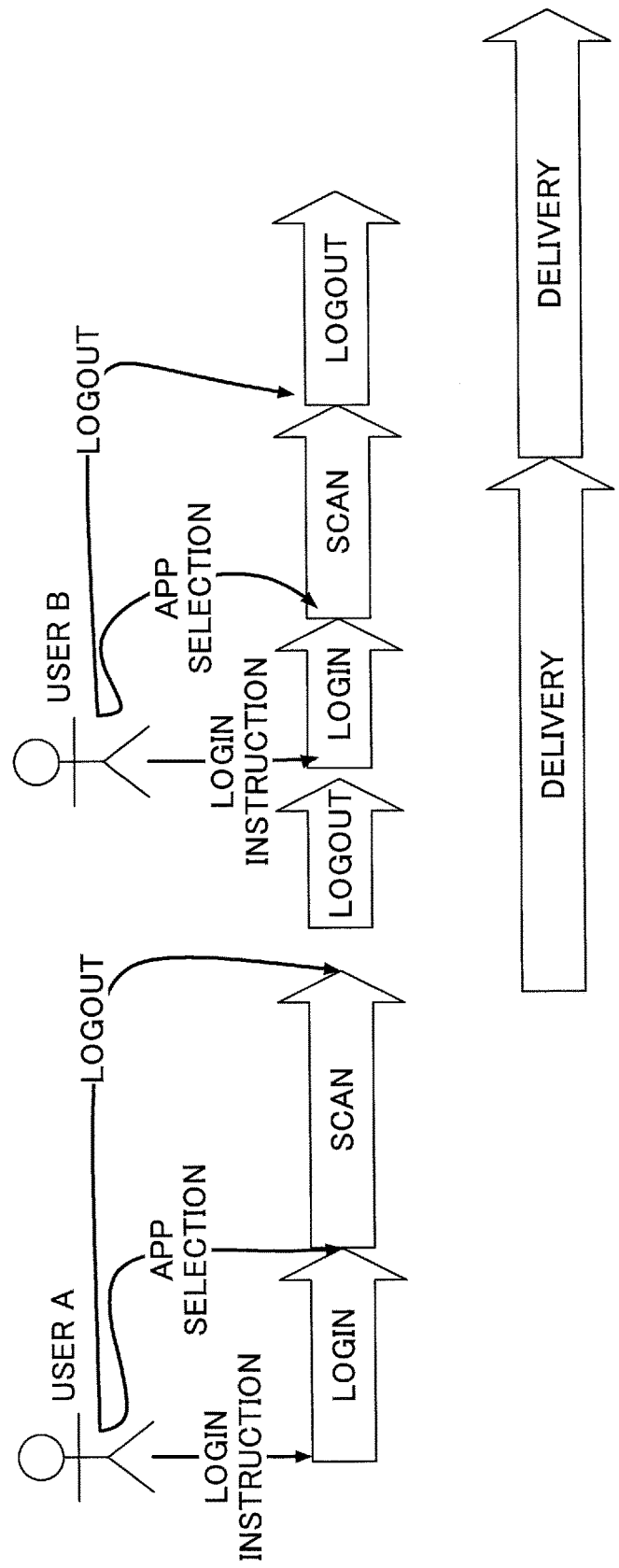
FIG. 16 illustrates stress-free operability in scanning and a delivery.

FIG. 16 illustrates the stress-free operability in the scanning and delivery.

FIG. 16 illustrates that the delivery (the upload) of the image data scanned from the original manuscript in a state where the user A is logging in the image forming apparatus 10 may be executed even after the user A logs out. In this case, the image forming apparatus 10 is subjected to a monopoly on the user A during the operation by the user A. However, the delivery process requiring a time depending on an influence of a network load, the data size of image data, or the like are executed in the background by the WF collaborating unit 125. Therefore, it is unnecessary that the delivery process is executed while the user A is logging in. Therefore, the user B may start the operation of the image forming apparatus 10 before the delivery process is completed.

Figure 17:
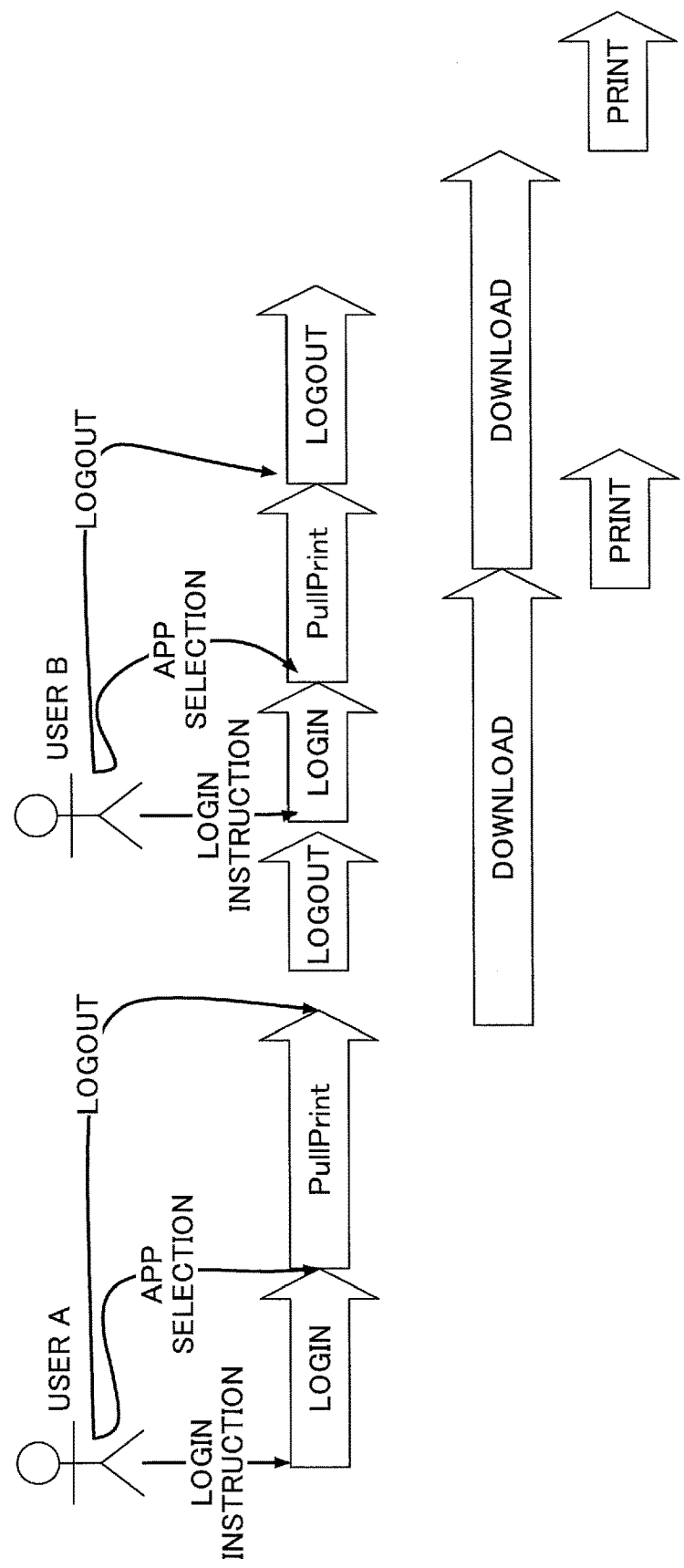
FIG. 17 illustrates stress-free operability in downloading and printing.

FIG. 17 illustrates stress-free operability in downloading and printing.

FIG. 17 illustrates that printing (PullPrint; printing that is requested to print in a state where the user A is logging in the image forming apparatus 10) of the data stored in the cloud storage 40 may be executed after the logout of the user A. Said differently, download and print processes requiring a time are executed in the background. Therefore, the download and print processes may not be executed during the login of the user A. Therefore, the user B may start the operation of the image forming apparatus 10 before the download and print processes are completed.

Figure 18:
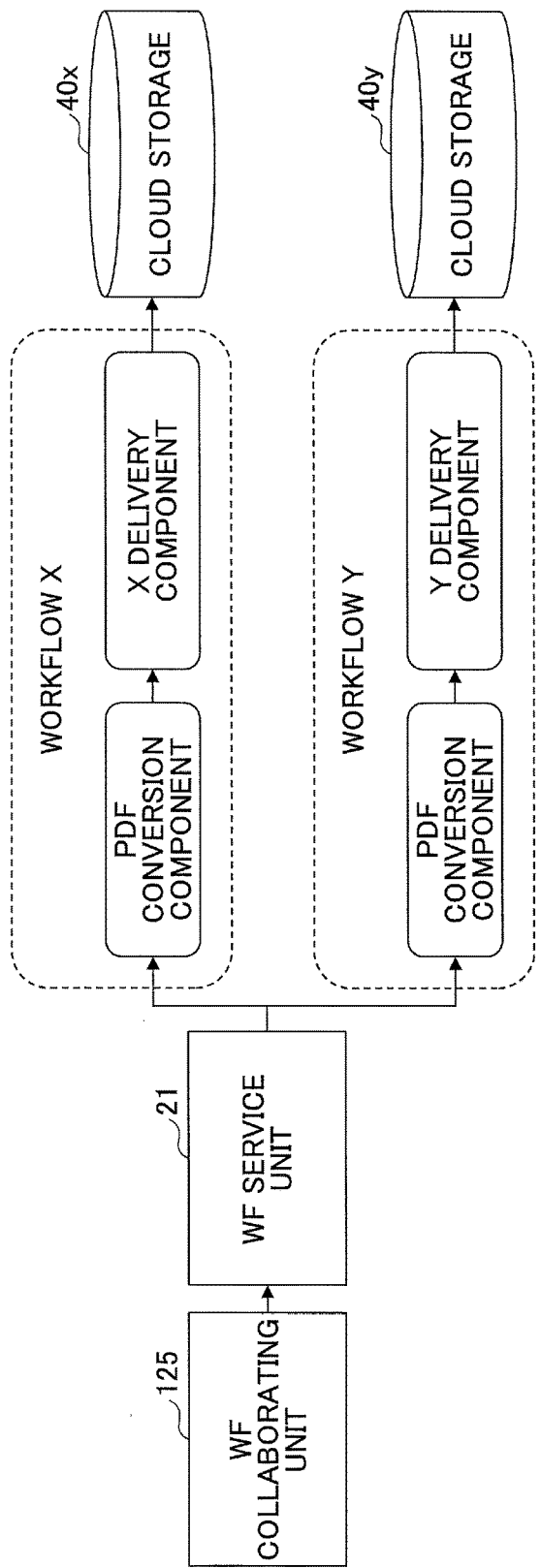
FIG. 18 illustrates an example of working in a WF service unit 21.

Subsequently, an example of working in the WF service unit 21 is described. FIG. 18 illustrates an example of working in the WF service unit 21.

FIG. 18 illustrates an example where two workflows of workflow X and workflow Y are defined. Each of the workflows is defined by a combination of a sequence of at least one component. The component is a program module substantializing a processing unit forming the workflow.

The workflow X is a combination of a PDF conversion component and an X delivery component. The workflow Y is a combination of a PDF conversion component and a Y delivery component.

The PDF conversion component is a component of converting the input image data to a PDF format. The X delivery component is a component of delivering the input data to the cloud storage 40x. Therefore, the X delivery component calls API unique to the cloud storage 40x and executes the delivery. The Y delivery component is a component of delivering the input data to the cloud storage 40y. Therefore, the Y delivery component calls API unique to the cloud storage 40y and executes the delivery. Said differently, a difference of the cloud storage 40x and the cloud storage 40y from API is absorbed by the X and Y delivery components.

In a case where this workflow is defined, the WF service unit 21 separates a workflow executed based on cstorage designated in an upload request from the WF collaborating unit 125. Said differently, in a case where cstorage designates the cloud storage 40x, the WF service unit 21 executes the workflow X. In a case where cstorage designates the cloud storage 40y, the WF service unit 21 executes the workflow Y.

As described above, in the case where the process of performing the WF service unit 21 is defined as the workflow, the total number of kinds of the workflows may be: the number of the unified API (the number of functions or methods)×the number of cloud storages 40, for example.

A program causing the image forming apparatus to implement the unified API unit 123 or the service collaborating unit 124 may be served by an operating entity (for example, a manufacturing company of the image forming apparatus 10). Thus, it is possible to establish a trust relationship between the unified API unit 123 and the service providing apparatus 20 or between the service collaborating unit 124 and the service providing apparatus 20. As a result, the developer of the app 121 or the user of the app 121 can shake off a sense of mistrust caused by a stopover in the service providing apparatus 20 of the date to be delivered (uploaded) or downloaded.

As described above, within the embodiment, API unique to each cloud storage 40 is concealed by the unified API. Therefore, it is possible to lower the dependency of each app 121 on API different for each cloud storage 40. As a result, an efficiency of developing a program using a service (a cloud storage 40) outside the image forming apparatus 10.

This embodiment may be applied to a case where the app 121 installed in the image forming apparatus 10 collaborates a service other than the cloud storage 40.

The mode of the program applied with this embodiment is not specifically limited. For example, a server-type program, which does not display a Graphical User Interface (GUI) such as a screen, may be applied with the app 121 of this embodiment.

Further, this embodiment may be applied to an apparatus other than the image forming apparatus 10. For example, the apparatus such as a projector, an electronic white board, and a television conference system may have a functional structure similar to that of the image forming apparatus 10.

Within the above embodiments, the image forming apparatus 10 is an example of the apparatus. The service providing apparatus 20 is an example of an information processing apparatus. The cloud storage 40 is an example of an external apparatus. The unified API is an example of a unified interface. The WF collaborating unit 125 is an example of a first transmission unit. The WF service unit 21 is an example of a second transmission unit. The authenticating unit 122 is an example of a specifying unit. The authentication screen 510 is example of a first screen. The access token is an example of first data. The permission screen 520 and the re-permission screen 530 are an example of a second screen. The access information memory unit 134 is an example of a memory unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system of the embodiments of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programed by software to execute the corresponding functions and hardware which is designed to execute the corresponding functions such as the ASIC and the circuit module.

What is claimed is:

1. An information processing system comprising:
   an apparatus; and
   an information processing apparatus that is coupled to multiple external apparatuses, which respectively receive a request through mutually different interfaces, wherein
     the apparatus includes
       a first processor, and
       a first memory storing a first program that causes the first processor to
         receive a first request through a unified interface, which is unified relative to interfaces of the multiple external apparatuses;
         send the received first request to the information processing apparatus; and
     the information processing apparatus includes
       a second processor, and
       a second memory storing a second program that causes the second processor to
         send a second request corresponding to the first request to the external apparatus through an interface of the external apparatus designated in the first request from among the multiple external apparatuses upon receipt of the first request.

2. The information processing system according to claim 1, wherein the execution of the first program further causes the first processor to
   specify a user who operates the apparatus; and
   display a first screen through which the user inputs authentication information to authenticate the user for using the information processing apparatus in a case where first data, which indicates that the user is already authenticated by the information processing apparatus, is not stored in the first memory at a time when the first request is received,
   store the first data acquired from the information processing apparatus based on the authentication information input through the first screen, and
   send the first request along with the first data stored in the first memory to the information processing apparatus.

3. The information processing system according to claim 2, wherein the execution of the first program further causes the first processor to
   send the first request to the information processing apparatus using the same first data in response to the first request received through the unified interface from multiple programs included in the apparatus during an operation by the authenticated user.

4. The information processing system according to claim 2, wherein the execution of the first program further causes the first processor to
   display a second screen through which the user enters permission information, which indicates whether the information processing apparatus is permitted to be used for the first program, in a case where the permission information is not stored in the first memory at a time when the first request is received, and
   store the permission information entered through the second screen by the user.

5. The information processing system according to claim 2, wherein
   the first data includes an expiry date, and
   the execution of the first program further causes the processor to
     display the first screen in a case where the first data whose expiry date expires are being stored in the memory unit, and does not display the first screen in a case where the first data whose expiry date does not expire are being stored in the memory unit.

6. The information processing system according to claim 2, wherein
   the external apparatus has a folder, and
   the execution of the first program further causes the processor to
     display the first screen in a case where the first data are not stored in the memory unit when the first transmission unit receives the first request as an acquisition request to acquire a folder view of folders in the external apparatus,
     store the first data acquired from the information processing apparatus in the memory based on the authentication information input through the first screen, and
   send the acquisition request for the folder view along with the first data stored in the memory unit to return the folder view returned from the information processing apparatus as a response to the first program.

7. The information processing system according to claim 1, wherein the execution of the first program further causes the first processor to
   send the first request to the information processing apparatus after responding to the first request.

8. The information processing system according to claim 1, wherein
   the first request is a delivery request to deliver second data to any one of the multiple external apparatuses.

9. An information processing method performed in an information processing system that includes an apparatus and an information processing apparatus coupled to multiple external apparatuses, which respectively receive a request through mutually different interfaces, the information processing method comprising:
   receiving a first request through a unified interface, which is unified relative to interfaces of the multiple external apparatuses;

sending, via a first program stored in a memory of the apparatus, the received first request to the information processing; and sending, via a second program stored in a memory of the information processing apparatus, a second request corresponding to the first request to the external apparatus through an interface of the external apparatus designated in the first request from among the multiple external apparatuses upon receipt of the first request.

10. An apparatus coupled to an information processing apparatus that is coupled to multiple external apparatuses, which respectively receive a request through mutually different interfaces, the apparatus comprising:

a first processor; and a first memory storing a first program that causes the first processor to receive a first request through a unified interface, which is unified relative to interfaces of the multiple external apparatuses;

send the received first request to the information processing apparatus, wherein the information processing apparatus sends a second request, corresponding to the first request, to the external apparatus through an interface of the external apparatus designated in the first request from among the multiple external apparatuses upon receiving the first request.

11. The apparatus according to claim 10, wherein execution of the first program further causes the first processor to specify a user who operates the apparatus; and display a first screen through which the user inputs authentication information to authenticate the user for using the information processing apparatus in a case where first data, which indicates that the user is already authenticated by the information processing apparatus, is not stored in the first memory at a time when the first request is received, store the first data acquired from the information processing apparatus based on authentication information input through the first screen, and send the first request along with the first data stored in the first memory to the information processing apparatus.

12. The apparatus according to claim 11, wherein the execution of the first program further causes the first processor to send the first request to the information processing apparatus using the same first data in response to the first request received through the unified interface from multiple programs included in the apparatus during an operation by the authenticated user.

13. The apparatus according to claim 11, wherein the execution of the first program further causes the first processor to display a second screen through which the user enters permission information, which indicates whether the information processing apparatus is permitted to be used for the first program, in a case where the permission information is not stored in the first memory at a time when the first request is received, and store the permission information entered through the second screen by the user.

14. The apparatus according to claim 11, wherein the first data includes an expiry date, and the execution of the first program further causes the processor to display the first screen in a case where the first data whose expiry date expires are being stored in the memory unit, and does not display the first screen in a case where the first data whose expiry date does not expire are being stored in the memory unit.

* * * * *